United States Patent
Nulkar et al.

(10) Patent No.: US 8,621,118 B1
(45) Date of Patent: Dec. 31, 2013

(54) USE OF SERVICE PROCESSOR TO RETRIEVE HARDWARE INFORMATION

(75) Inventors: Chaitanya Nulkar, Sunnyvale, CA (US); Brad Reger, Dublin, CA (US); Pradeep Kalra, San Jose, CA (US); Johnny Kang-wing Chan, Sunnyvale, CA (US); Thomas Holland, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 12/908,764

(22) Filed: Oct. 20, 2010

(51) Int. Cl.
*G06F 3/00* (2006.01)

(52) U.S. Cl.
USPC ............ 710/15; 710/5; 710/7; 710/8; 710/16; 710/17; 710/18; 710/19

(58) Field of Classification Search
USPC .................. 710/5, 7, 8, 15, 16, 17, 18, 19
See application file for complete search history.

(56) References Cited

U.S. PATENT DOCUMENTS

| | | | |
|---|---|---|---|
| 5,398,332 A * | 3/1995 | Komoda et al. ................. 714/55 |
| 7,406,670 B1 * | 7/2008 | Ansari et al. ................. 716/136 |
| 7,774,659 B2 * | 8/2010 | Roussel ........................... 714/55 |
| 2004/0078695 A1 * | 4/2004 | Bowers et al. ................. 714/39 |
| 2005/0240669 A1 * | 10/2005 | Khanna et al. ................. 709/225 |
| 2006/0031706 A1 * | 2/2006 | Ramirez ........................... 714/1 |
| 2008/0215927 A1 * | 9/2008 | Roussel ........................... 714/47 |
| 2009/0235233 A1 * | 9/2009 | Suzuki et al. ................. 717/124 |
| 2009/0300644 A1 * | 12/2009 | Lee et al. ...................... 718/106 |

* cited by examiner

*Primary Examiner* — Idriss N Alrobaye
*Assistant Examiner* — Jasjit Vidwan
(74) *Attorney, Agent, or Firm* — Mahamedi Paradice Kreisman LLP (57) ABSTRACT

Various techniques and hardware are described for retrieving information in a processing system. In one embodiment, a method is provided for retrieving information in a processing system that includes a central processing unit and a service processor. Here, the service processor retrieves central processing unit information from the central processing unit and resets the processing system after the retrieval of the central processing unit information.

19 Claims, 8 Drawing Sheets

USE OF SERVICE PROCESSOR TO RETRIEVE HARDWARE INFORMATION

FIELD

The present disclosure relates generally to diagnosing processing systems and more specifically to use of a service processor to retrieve hardware information.

BACKGROUND

When a computer system crashes, an operating system executed on the computer system may dump contents of main memory at the time of the crash onto a file. This dump is referred to as a core dump, and the information in the core dump is generally used to debug or analyze errors in computer programs or computer systems.

However, in conventional computer systems, only the operating system generates a core dump. If the operating system also malfunctions in the computer system crash, then a core dump cannot be generated. Instead, many conventional computer systems simply reset themselves in a computer system crash. Without any information being recorded at the time of the crash, it would be difficult to diagnose or analyze the errors that caused the crash.

SUMMARY

Embodiments of the present invention provide various techniques for retrieving information from a central processing unit (CPU). As an example, information from a central processing unit (CPU) in a processing system can be retrieved, even when an operating system has malfunctioned, in the event of a system crash. Particularly, the processing system uses a service processor to retrieve information about the CPU from the CPU itself.

It should be appreciated that in addition to a CPU, a processing system also has a separate service processor that controls the various hardware components of the processing system. Many processing systems include such a service processor in order to offload many hardware specific tasks from the CPU. This offloading of tasks by the service processor provides the CPU with more bandwidth to handle application specific tasks, thereby speeding the execution of applications. It should be appreciated that traditional service processors are not configured to retrieve information used for diagnosing a system crash, but as explained in detail below, embodiments of the present invention provide various techniques for using service processors to retrieve such information directly from the CPU.

The service processor operates independently from the CPU and from the operating system executed by the CPU. Accordingly, the service processor is still operable in the event that the operating system malfunctions as a result of a CPU stall. In one example, the service processor can be used to retrieve various information about the CPU and/or about other hardware components of the processing system. The retrieval can be initiated when a stall of the CPU is detected or when a user manually initiates the retrieval. Additionally, the service processor can also be programmed to initiate retrieval at predefined intervals. Once the information is retrieved, it may be used to diagnose the errors that caused, for example, the CPU to stall.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Figure 1:
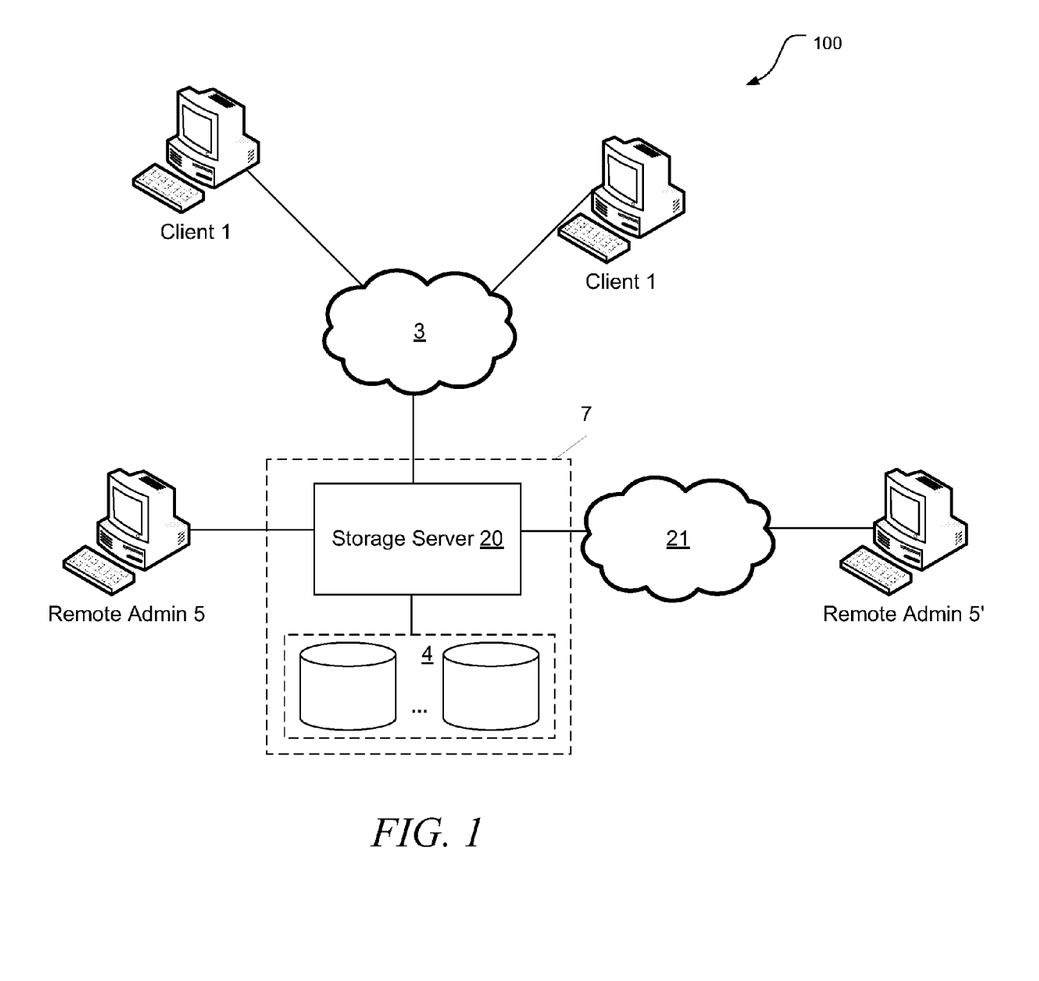
FIG. 1 depicts a block diagram of a system of processing systems, consistent with one embodiment of the present invention.

FIG. 1 depicts a block diagram of a system 100 of processing systems, consistent with one embodiment of the present invention. As depicted, the system 100 includes a storage system 7 and various processing systems (e.g., clients 1 and administrative consoles 5) in communication with the storage system 7 through networks 3 and 21, such as a local area network (LAN) or wide area network (WAN). The storage system 7 operates on behalf of the clients 1 to store and manage shared files or other units of data (e.g., blocks) in the set of mass storage devices. Each of the clients 1 may be, for example, a conventional personal computer (PC), a workstation, a smart phone, or other processing systems. In this example, the storage system 7 includes a storage server 20 in communication with a storage subsystem 4. The storage server 20 manages the storage subsystem 4 and receives and responds to various read and write requests from the clients 1, directed to data stored in, or to be stored in, the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The mass storage devices may be organized into one or more volumes of Redundant Array of Inexpensive Disks (RAID).

Also depicted in FIG. 1 is a local administrative console 5 in communication with the storage system 7. The storage server 20 in this configuration includes a communication port (e.g., RS-232) and appropriate software to allow direct communication between the storage server 20 and the local administrative console 5 through a transmission line. This configuration enables a network administrator to perform management functions on the storage server 20. The storage server 20 can also be managed through a network 21 from a remote administrative console 5'. It should be noted that while network 3 and network 21 are depicted as separate networks in FIG. 1, they can also be the same network.

Figure 2:
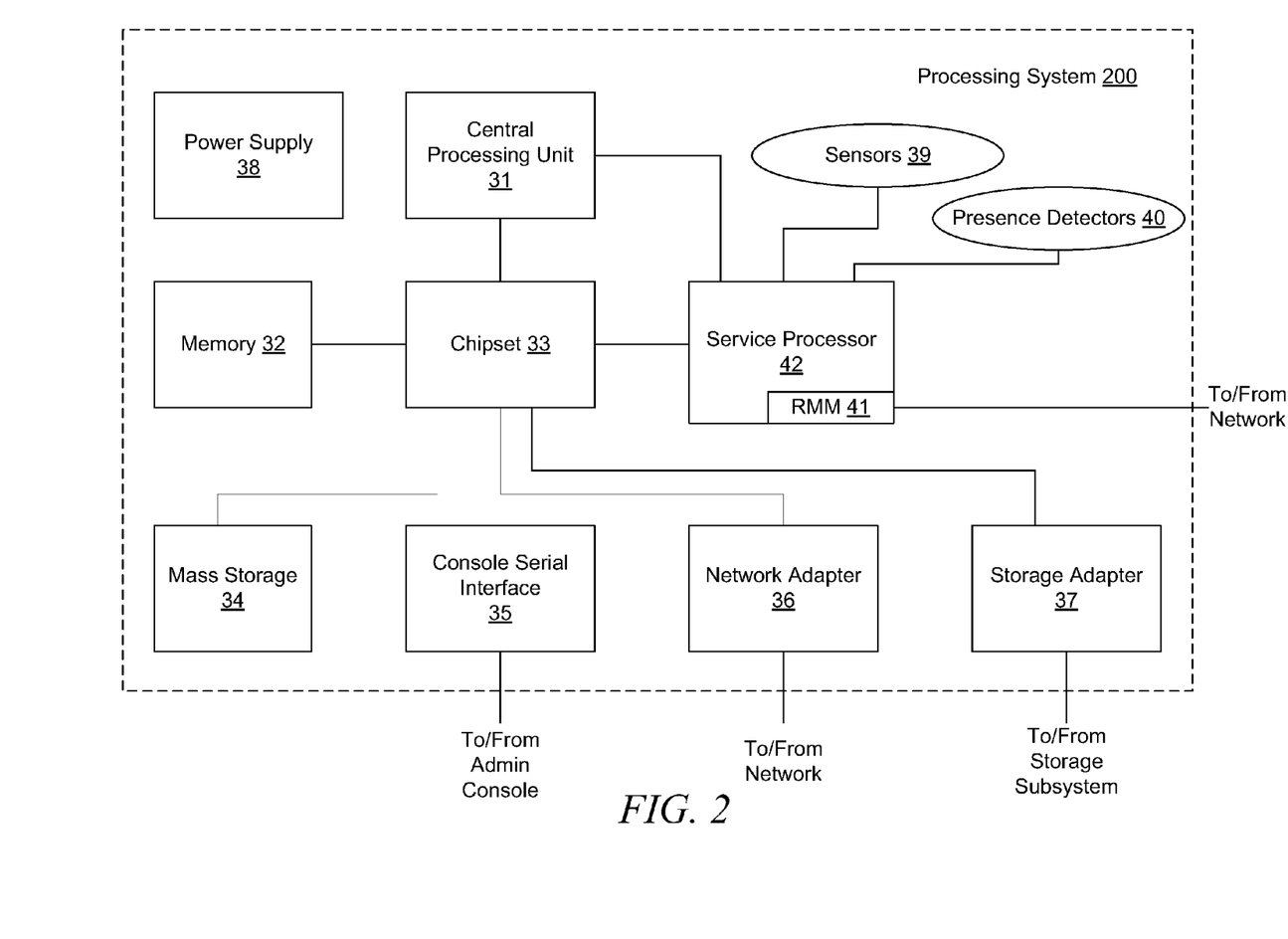
FIG. 2 depicts a high-level block diagram of a storage server, according to at least one embodiment of the present invention.

FIG. 2 depicts a high-level block diagram of a machine in the example form of a processing system 200 within which may be executed a set of instructions for causing the machine to perform any one or more of the methodologies discussed herein. The processing system 200 may be deployed in the form of, for example, a storage server, a personal computer, a tablet personal computer, a laptop computer, a smart phone, or a variety of other processing systems. In the embodiment where the processing system 200 is a storage server (e.g., storage server 20 depicted in FIG. 1), the storage server may be, for example, a file server, and more particularly, a network attached storage (NAS) appliance. Alternatively, the storage server may be a server that provides clients with access to information organized as data containers, such as individual data blocks, as may be the case in a storage area network (SAN). In yet another example, the storage server may be a device that provides clients with access to data at both the file level and the block level.

The processing system 200 includes one or more CPUs 31 and memory 32, which are coupled to each other through a chipset 33. The chipset 33 may include, for example, a memory controller hub and input/output hub combination. The CPU 31 of the processing system 200 and may be, for example, one or more programmable general-purpose or special-purpose microprocessors or digital signal processors (DSPs), microcontrollers, application specific integrated circuits (ASICs), programmable logic devices (PLDs), or a combination of such devices. The memory 32 may be, or may include, any of various forms of read-only memory (ROM), random access memory (RAM), Flash memory, or the like, or a combination of such devices. The memory 32 stores, among other things, the operating system of the processing system 200.

The processing system 200 also includes one or more internal mass storage devices 34, a console serial interface 35, a network adapter 36, and a storage adapter 37, which are coupled to the CPU 31 through the chipset 33. The processing system 200 also includes a power supply 38, as shown. The internal mass storage devices 34 may be or include any machine-readable medium for storing large volumes of data in a non-volatile manner, such as one or more magnetic or optical based disks, or for storing one or more sets of data structures and instructions (e.g., software) embodying or utilized by any one or more of the methodologies or functions described herein. The serial interface 35, an RS-232 port or Universal Serial Bus (USB) port, allows a direct serial connection with, for example, a local administrative console. The storage adapter 37 allows the processing system 200 to access a storage subsystem and may be, for example, a Fibre Channel adapter or a Small Computer System Interface (SCSI) adapter. The network adapter 36, such as an Ethernet adapter, provides the processing system 200 with the ability to communicate with remote devices over a network.

The processing system 200 further includes a number of sensors 39 and presence detectors 40. The sensors 39 are used to detect changes in the state of various environmental variables or parameters in the processing system 200, such as temperatures, voltages, binary states, and other parameters. The presence detectors 40 are used to detect the presence or absence of various hardware components within the processing system 200, such as a cooling fan, a particular circuit card, or other hardware components.

The service processor 42, at a high level, monitors and/or manages the various hardware components of the processing system 200. Examples of monitoring and management functionalities are described in more detail below. The service processor 42 may be, for example, one or more programmable general-purpose or special-purpose microprocessors or digital signal processors (DSPs), microcontrollers, application specific integrated circuits (ASICs), programmable logic devices (PLDs), or a combination of such devices. Many processing systems include such a service processor 42 to offload many hardware specific tasks from the CPU 31. This offloading of tasks by the service processor 42 provides the CPU 31 with more bandwidth to handle application specific tasks, thereby speeding the execution of applications executed by the CPU 31. The service processor 42 is independent and separate from the CPU 31 and, in this example of the processing system 200, the service processor 42 is coupled to the RMM 41 as well as to the chipset 33 and CPU 31, and receives input from the sensors 39 and presence detectors 40. It should be noted that the service processor 42 is independent from the CPU 31 in that the processing of the service processor 42 is not dependent on the CPU 31. In other words, the service processor 42 can function independently of the CPU 31 and therefore the service processor 42 can still function if the CPU 31 stalls or malfunctions. Furthermore, the service processor 42 is physically separate from the CPU 31 where the internal components of the service processor 42 is separated from the CPU 31 by an intervening barrier or space. For example, the service processor 42 may be embodied within a microchip while the CPU 31 may be embodied in a different microchip. As explained in more detail below, the service processor 42 is configured to retrieve various information from the CPU 31 or from other hardware components, and such information may be used in the analysis or diagnosis of errors in the processing system 200.

In the embodiment depicted in FIG. 2, the service processor 42 further includes a remote management module (RMM) 41 that provides a network interface and allows a remote processing system, such as a remote administrative console, to control and/or perform various management functions on the processing system 200 by way of a network. The RMM 41 may be in the form of a dedicated circuit card separate from the other hardware components of the processing system 200. The RMM 41 has a network interface that connects to the network and a separate internal interface that connects to one or more hardware components of the processing system. The RMM typically includes control circuitry (e.g., a microprocessor or microcontroller) which is programmed or otherwise configured to respond to commands received from a remote administrative console via the network and to perform at least some of the management functions.

It should be appreciated that in other embodiments, the processing system 200 may include fewer or more components apart from those shown in FIG. 2. For example, in an alternate embodiment, the processing system 200 may not include the RMM 41. In yet another embodiment, the processing system 200 may not include the storage adapter 37.

Figure 3:
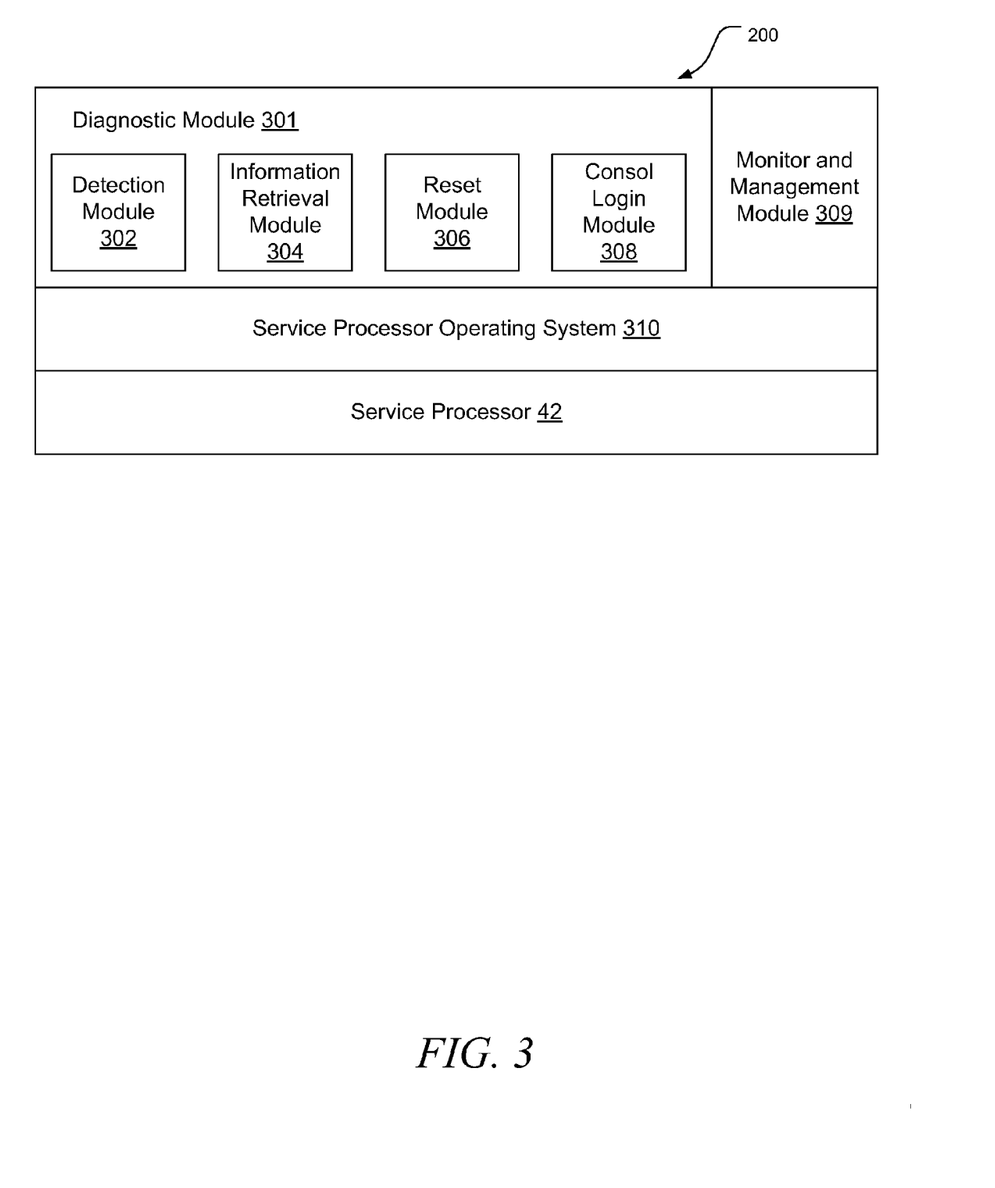
FIG. 3 depicts an architectural block diagram of the hardware and software associated with a processing system, in accordance with an embodiment of the present invention.

FIG. 3 depicts an architectural block diagram of the hardware and software associated with the processing system 200, in accordance with an embodiment of the present invention.

As depicted, the processing system 200 includes a service processor 42, a service processor operating system 310, a monitor and management module 309, and a diagnostic module 301. The service processor 42 executes a service processor operating system 310 that manages various software processes and/or services. For example, the service processor operating system 310 controls and schedules execution of processes by the service processor 42. It should be noted that the service processor operating system 310 is separate and independent from the main operating system executed by a CPU. Accordingly, if the main operating system malfunctions, the service processor operating system 310 may continue to function because it is executed on a different hardware component, namely the service processor 42.

In this embodiment, the software processes and/or other services executed by the service processor 42 include a diagnostic module 301 and a monitor and management module 309. As described in more detail below, the monitor and management module 309 monitors and/or manages various components of a processing system. The diagnostic module 301 is configured to retrieve information from the CPU or other hardware components. As depicted in FIG. 3, the diagnostic module 301 may include a detection module 302, an information retrieval module 304, a reset module 306, and a console login module 308. As explained in more detail below, the detection module 302 is configured to detect that a CPU included in the processing system 200 has stalled. The information retrieval module 304 is configured to retrieve information directly from the CPU, as also explained in more detail below. After the information is retrieved, the reset module 306 is configured to reset the processing system 200 in order to, for example, attempt to place or return the CPU into an operational state. As also explained in more detail below, the console login module 308 provides a user with access to the processing system 200 such that the user can access or retrieve the information retrieved before the reset.

In other embodiments, the processing system 200 may include fewer or more modules apart from those shown in FIG. 3. For example, in an alternate embodiment, the diagnostic module 301 may exclude the console login module 308 and the reset module 306. The functionalities of the reset module 306 and the console login module 308 may be handled by, for example, a different module. In the example depicted in FIG. 3, the modules 302, 304, 306, and 308 are in the form of software that is processed by the service processor 42. In another example, the modules 302, 304, 306, and 308 may be in the form of firmware that is processed by Application Specific Integrated Circuits (ASICs), which may be integrated into a circuit board. Alternatively, modules 302, 304, 306, and 308 may be in the form of one or more logic blocks included in a programmable logic device (e.g., a field-programmable gate array). The described modules may be adapted, and/or additional structures may be provided, to provide alternative or additional functionalities beyond those specifically discussed in reference to FIG. 3. Examples of such alternative or additional functionalities will be discussed in reference to the flow diagrams discussed below. The modifications or additions to the structures described in relation to FIG. 3 to implement these alternative or additional functionalities will be implementable by those skilled in the art, having the benefit of the present specification and teachings.

Figure 4:
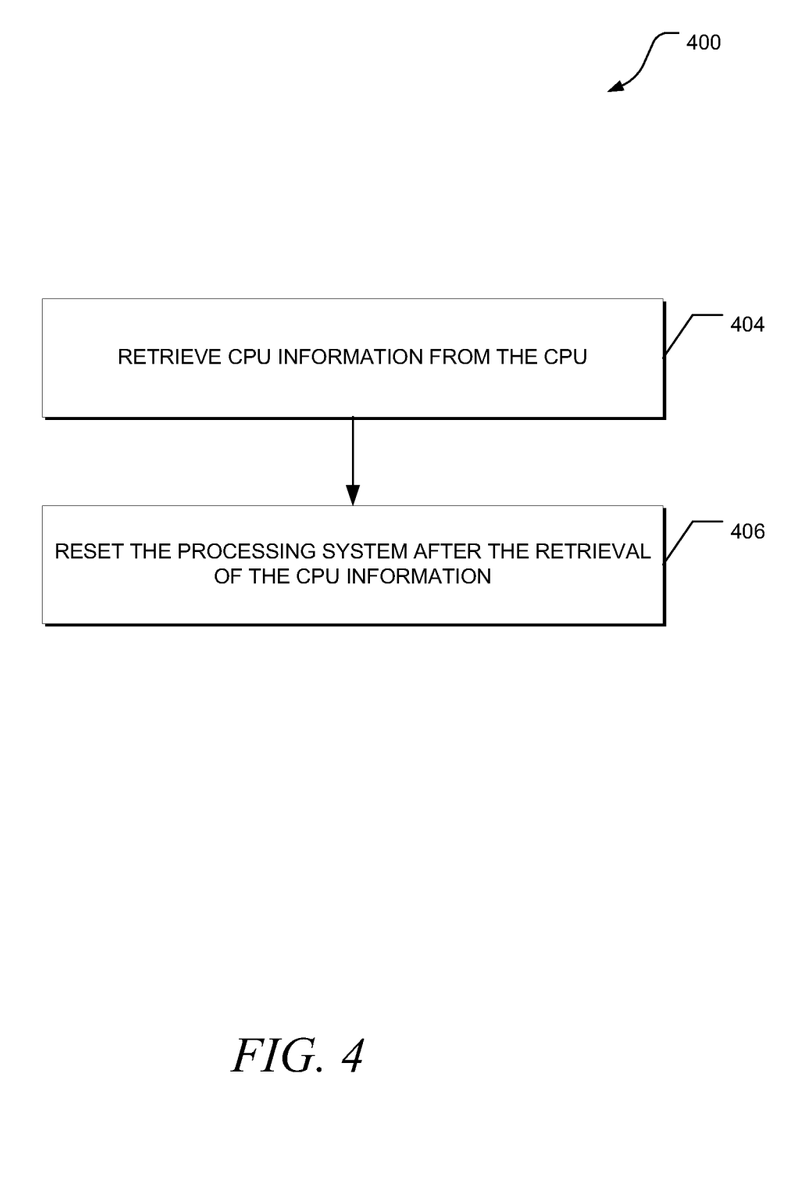
FIG. 4 depicts a flow diagram of a general overview of a method, in accordance with an embodiment, for retrieving information from a processing system that has a CPU and a service processor.

FIG. 4 depicts a flow diagram of a general overview of a method 400, in accordance with an embodiment, for retrieving information from a processing system that has a CPU and a service processor. In one example, the method 400 may be implemented by the diagnostic module 301 depicted in FIG. 3 and employed in the processing system 200. Referring to FIG. 4, the service processor retrieves CPU information directly from the CPU at 404. As used herein, "CPU information" refers to information associated with the CPU. Examples of CPU information include a state of the CPU, a CPU event, contents of CPU registers, and other information associated with the CPU. As explained in more detail below, the service processor can also retrieve additional information related to other hardware components of the processing system. In one embodiment, the retrieved CPU information may then be stored in a non-volatile storage device for later retrieval by a user for use in diagnosing, for example, any CPU or other hardware related errors. In an alternate embodiment, the retrieved CPU information may be transmitted to a different processing system.

After the CPU information is retrieved, the service processor then resets the processing system at 406. In general, a reset refers to clearing any pending errors or events and bringing a processing system to normal condition or initial state. An example of a reset may be a hard reset where power is removed and subsequently restored to a processing system. Another example of a reset may be a soft reset where system software, such as the operating system, is terminated and subsequently executed again in a processing system. Particularly, a soft reset is restarting a processing system under operating system control, without removing power.

It should be appreciated that the resetting of the processing system at 406 is optional as not all processing systems need to be reset after the CPU information is retrieved. In another embodiment, instead of resetting the CPU after information retrieval, the CPU may be allowed to continue to operate. In an alternate embodiment, the service processor may modify a state of the CPU based on the retrieved CPU information, and then allow the CPU to continue to operate based on the modified state. For example, the service processor can modify the CPU state by changing the registers of a CPU processing core.

Figure 5:
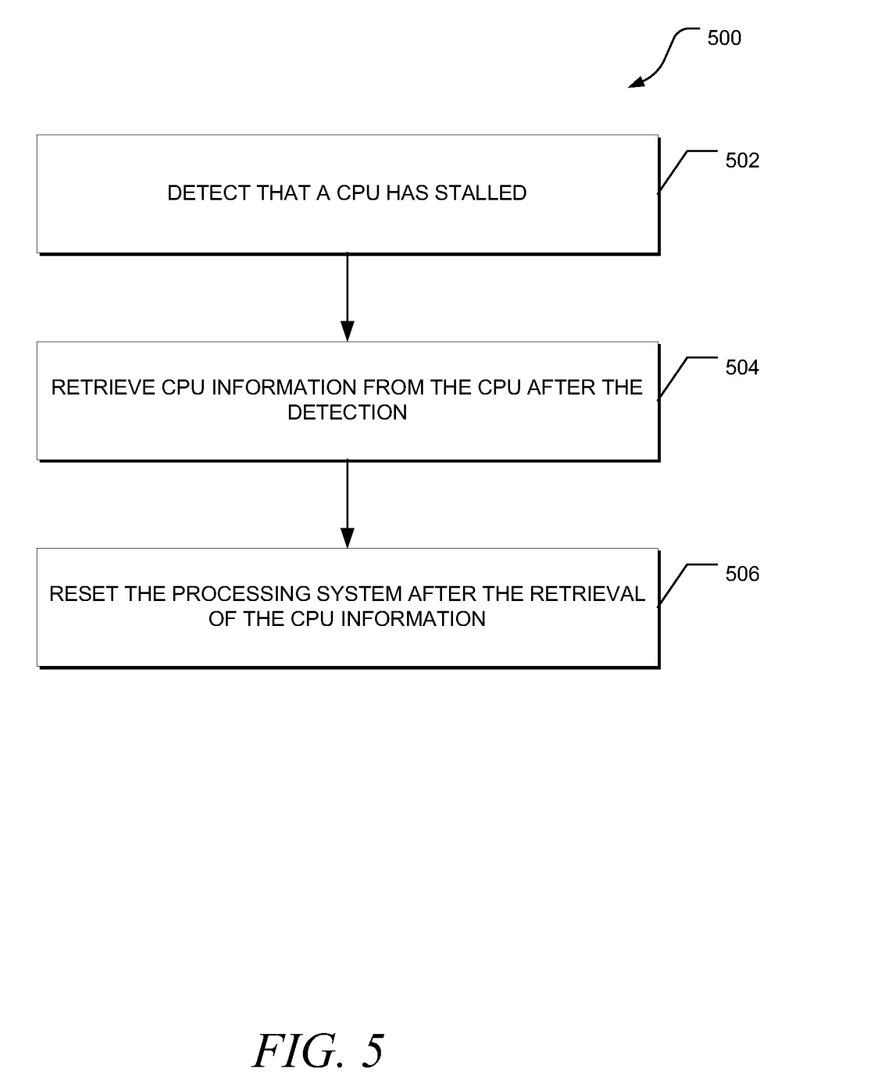
FIG. 5 depicts a flow diagram of a general overview of a method, in accordance with an alternate embodiment, for retrieving information from a processing system that has a CPU and a service processor.

FIG. 5 depicts a flow diagram of a general overview of a method 500, in accordance with an alternate embodiment, for retrieving information from a processing system that has a CPU and a service processor. In one example, the method 500 may be implemented by the diagnostic module 301 depicted in FIG. 3 and employed in the processing system 200. Referring to FIG. 5, the service processor detects at 502 that the CPU has stalled. It should be appreciated that a CPU is a state machine and has various internal components. In order to be able to fully function, a CPU needs all of its components of subsystems to be in a consistent state or known state. However, a CPU or a subsystem of the CPU may refuse to continue its current operation if it is in an inconsistent state or the data it depends to transition to the next state is not available. Such conditions can "stall" a CPU.

In one example, the detection of the stall at 502 can be based on the receipt of heartbeat messages. In particular, the CPU can be configured to transmit heartbeat messages to a service processor at predefined intervals. If the CPU has completely stalled, the CPU is not able to transmit these heartbeat messages. When the service processor does not receive the heartbeat messages within a predefined interval, the service processor can identify and therefore detect that the CPU has stalled. In another example, the detection of the stall can be based on receipt of an event signal from the CPU. Particularly, if the CPU has not completely stalled, a functioning subsystem within the CPU may detect an error condition within other subsystems of the CPU and send an event signal notifying the service processor of the error condition. In other words, a functioning subsystem of the CPU may detect that another subsystem has stalled and accordingly, send an event signal to the service processor notifying it of the stall in at least one of the subsystems.

Still referring to FIG. 5, after the service processor has detected that the CPU has stalled, the service processor then retrieves CPU information directly from the CPU at 504, the retrieval of which is described in detail below. With the CPU information retrieved, the service processor then resets the processing system at 506. It should be noted that the retrieval of the CPU information or other hardware related information may not necessarily be triggered based on the detection that a CPU has stalled. In another embodiment, the service processor may be configured to automatically retrieve CPU information at predefined intervals, without a subsequent reset of the processing system. The CPU information may be automatically retrieved when there is no apparent error in the CPU, but such information may be useful for other CPU related analysis. In yet another embodiment, a user can manually trigger the retrieval of CPU information through use of, for example, a remote administrative console.

Figure 6A:
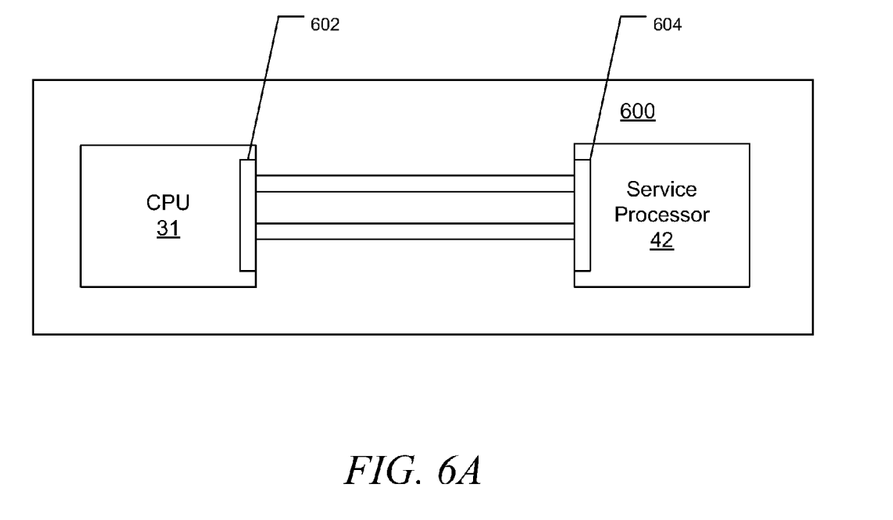
FIGS. 6A and 6B depict circuit diagrams illustrating the retrieval of CPU information by a service processor, consistent with different embodiments of the present invention.
Figure 6B:
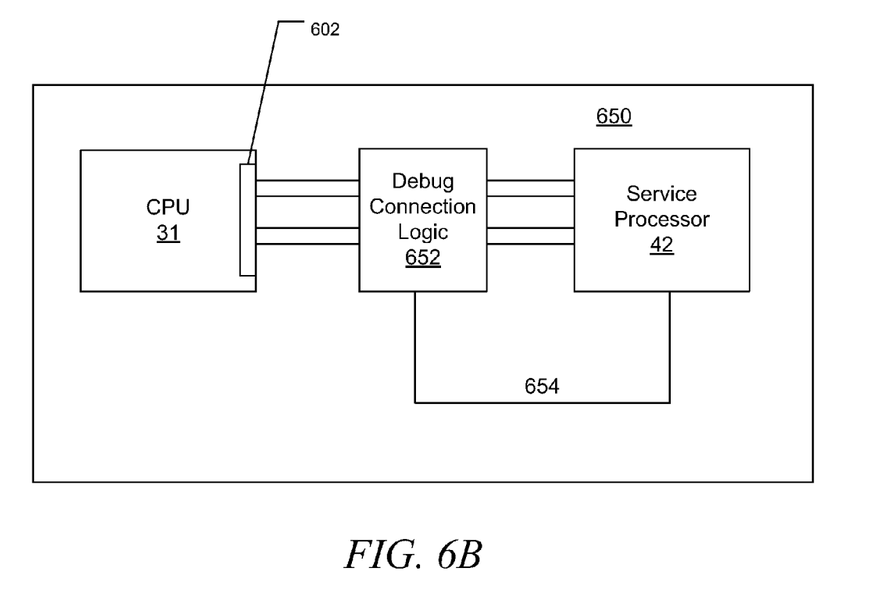

FIGS. 6A and 6B depict circuit diagrams illustrating the retrieval of CPU information by a service processor, consistent with different embodiments of the present invention. As depicted in FIG. 6A, one embodiment of a processing system 600 includes a CPU 31 and a service processor 42. Here, the CPU 31 includes a test access interface 602, which is an interface that is included in many hardware components for use in, for example, testing circuit board assemblies and debugging embedded systems. An example of such a test access interface 602 is Joint Test Action Group (JTAG) interface (or IEEE 1149.1). The JTAG interface is a specialized four/five-pin interface added to a hardware component, such as the CPU 31. The connector pins are Test Data In (TDI), Test Data Out (TDO), Test Clock (TCK), Test Mode Select (TMS), and Test Reset (TRST). Another example of a test access interface 602 is a Serial Peripheral Interface Bus (SPI bus), which is a synchronous serial data link that operates in full duplex mode. The SPI bus specifies four logic signals, namely Serial Clock (SCLK), Master Output, Slave Input (MOSI/SIMO), Master Input, Slave Output (MISO/SOMI), and Slave Select (SS). Yet another example of a test access interface 602 is a Platform Environment Control Interface (PECI) bus, which allows access to temperature data or other data from chipset components. In particular, the PECI bus is a single-wire interface with a variable data transfer speed.

In the embodiment depicted in FIG. 6A, the service processor 42 is connected to the test access interface 602 included in the CPU 31 by way of a general purpose I/O port 604 included in the service processor 42. A general purpose I/O port 604 is a port that is available on the service processor 42 and may be used for a variety of different applications. For example, a general purpose I/O port 604 may be a four-bit or eight-bit I/O port used to connect to other hardware components for light-emitting diode (LED) driving, monitoring switches, communicating data, or other applications. When instructed, the service processor 42 can retrieve CPU information directly from the CPU 31 by way of the test access interface 602. As an example, if the test access interface 602 is a JTAG interface, the service processor 42 can retrieve the CPU information from the TDO.

In the alternate embodiment depicted in FIG. 6B, the CPU 31 can be connected to the service processor 42 by way of a debug connection logic 652. This alternate processing system 650 includes the CPU 31, the debug connection logic 652, and a service processor 42, where the debug connection logic 652 is connected to both the CPU 31 and the service processor 42. Generally, the debug connection logic 652 functions as a connecting switch between the CPU 31 and the service processor 42. When the service processor 42 is not instructed to retrieve CPU information from the CPU 31, the debug connection logic 652 disconnects the CPU 31 from the service processor 42 such that any errant data or signals cannot be transmitted between the CPU 31 and the service processor 42. This disconnection is implemented to assure that the service processor 42 cannot inadvertently transmit any signals or data to the CPU 31 that may interfere with the operations of the CPU 31.

However, when the service processor 42 is instructed to retrieve CPU information from the CPU 31, the service processor 42 transmits a signal by way of connection 654 to the debug connection logic 652 to access the CPU 31. In one embodiment, upon receipt of this signal, the debug connection logic 652 connects the service processor 42 to the CPU 31 such that the service processor 42 can directly retrieve the CPU information from the CPU 31 by way of the test access interface 602. After the CPU information is retrieved, the service processor 42 can transmit another signal to the debug connection logic 652 by way of connection 654 to instruct the debug connection logic 652 to disconnect the service processor 42 from the CPU 31. In an alternate embodiment, the debug connection logic 652 may include a timer set for a particular predefined time period, and the debug connection logic 652 can be configured to connect the service processor 42 to the CPU 31 for this particular predefined time period. Upon expiration of the time period, the debug connection logic 652 automatically disconnects the service processor 42 from the CPU 31 without any instructions to do so from the service processor 42.

Figure 7:
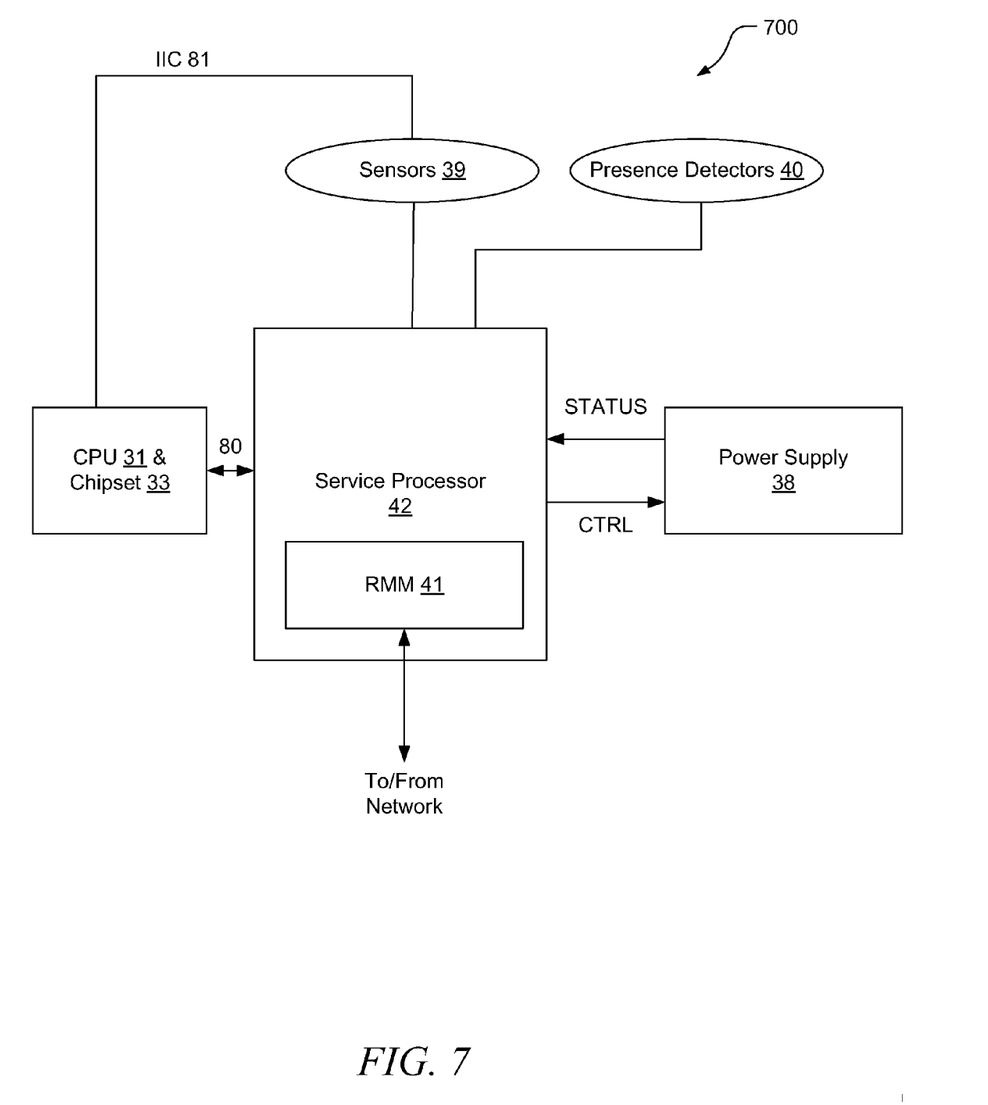
FIG. 7 depicts a circuit diagram of the detailed connections between a service processor and other components of a processing system, according to an embodiment of the present invention.

FIG. 7 depicts a circuit diagram of the detailed connections between a service processor 42 and other components of a processing system 700, according to an embodiment of the present invention. Here, the processing system 700 includes the service processor 42 connected to and in communication with sensors 39, presence detectors 40, CPU 31, chipset 33, and power supply 38. The sensors 39 are also connected to the CPU 31 and chipset 33 by, for example, an Inter IC bus 81, which allows communication between hardware components on a circuit board. As discussed above, the service processor 42 monitors and/or manages the various hardware components of the processing system 700. In one example, such monitoring and management functionalities can be provided by a monitor and management module 309, as described above in FIG. 3, that is embodied or executed by the service processor 42. Examples of such functionalities include data logging, setting platform event traps, keeping a system event log, providing remote access to the processing system 700, and monitoring various parameters associated with hardware components.

For example, the service processor 42 can monitor various parameters or variables present in a processing system, such as the temperature, voltage, fan speed, and/or current, through use of various sensors 39. If the service processor 42 detects that a particular parameter has fallen below or exceeds a certain threshold, then the service processor 42 can log the readings and, as discussed below, transmit messages with the reading to other processing systems by way of the RMM 41. In another example, as discussed above, the service processor 42 can detect the presence or absence of various hardware components in the processing system 700 by way of the presence detectors 40.

The service processor 42 also monitors the processing system 700 for changes in system-specified signals that are of interest. When any of these signals change, the service processor 42 captures and logs the state of the signals. For example, the service processor 42 can log system events, such as boot progress, field replaceable unit changes, operating system generated events, and service processor command history.

The service processor 42 can also be configured to control various hardware components of the processing system 700, such as the power supply 38. For example, the service processor 42 can provide a control signal CTRL to the power supply 38 to enable or disable the power supply 38. Additionally, the service processor 42 can collect status information about the power supply 38 with the receipt of the status signal STATUS from the power supply 38. The service processor 42 can also shut down, power-cycle, generate a non-maskable interrupt (NMI), or reboot the processing system 700, regardless of the state of the CPU 31 and chipset 33.

The service processor 42 can also be connected to a local administrative console by way of a serial communication port (not shown). In this connection, a user can log into the service processor 42 using a secure shell client application from the local administrative console. Alternatively, the service processor 42 can also be connected to a remote administrative console by way of the RMM 41 that provides a network interface, and can transmit messages to and from the remote administrative console. For example, upon detection of a specified critical event, the service processor 42 can automatically dispatch an alert e-mail or other form of electronic alert message to the remote administrative console.

Figure 8:
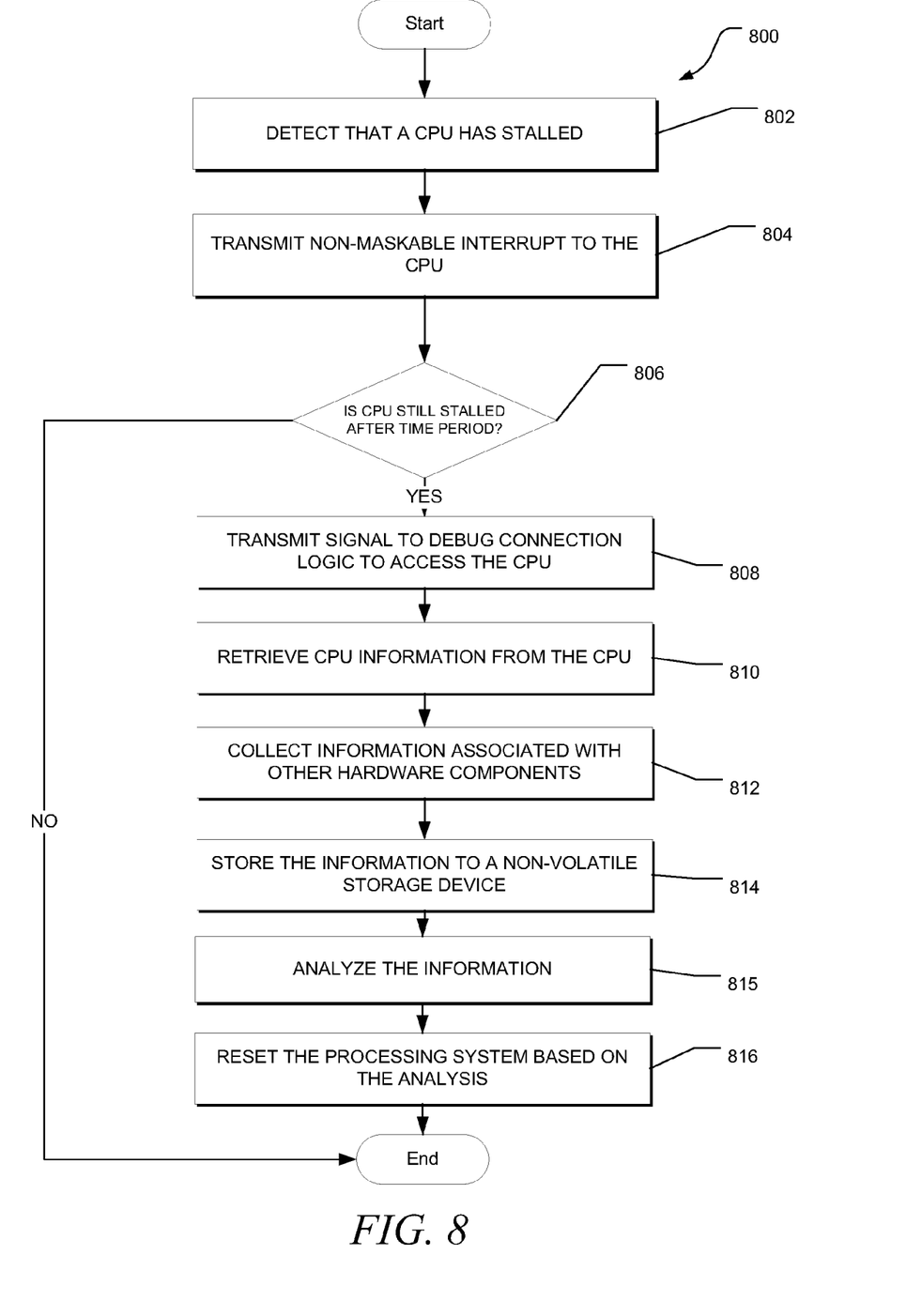
FIG. 8 depicts a flow diagram of a more detailed method, in accordance with an alternate embodiment, for retrieving information from a processing system that has a CPU and a service processor.

FIG. 8 depicts a flow diagram of a more detailed method, in accordance with an alternate embodiment, for retrieving information from a processing system that has a CPU and a service processor. In one example, the method 800 may be implemented by the diagnostic module 301 depicted in FIG. 3 and employed in the processing system 200. Referring to FIG. 8, the service processor detects that the CPU has stalled at 802 and thereafter, transmits an NMI to the CPU to attempt to wake the CPU at 804. An NMI is a type of CPU interrupt that cannot be ignored by standard interrupt masking techniques.

The service processor then waits for a time period after transmittal of the NMI and attempts to detect whether the CPU continues to be stalled during this particular time period. If the service processor detects that the CPU has become functional within this time period, then the service processor does not take any further actions.

However, if the service processor detects that the CPU is still stalled after this time period, then the service processor is configured to transmit a signal to a debug connection logic, which connects to both the CPU and the service processor, to access the CPU at 808. The debug connection logic connects the service processor to the CPU upon receipt of the signal such that the service processor can retrieve CPU information from the CPU at 810.

Additionally, as described above, the service processor has access to or has logged other information associated with other hardware components (e.g., system events and temperature). The service processor collects these other information at 812 and may then store all the information retrieved to a non-volatile storage device, such as a hard disk drive, at 814. In an alternate embodiment, the service processor may instead transmit the collected information to a different processing system, such as a remote administrative console.

The processing system may then be reset at 816. However, before the processing system is reset in the event of a CPU stall, the service processor, in one embodiment, can also be configured to analyze the collected information (including the CPU information retrieved) at 815 and take different actions based on the results of the analysis. For example, the service processor can reset the processing system based on the results of the analysis. Here, the service processor can analyze the collected information, remap particular subcomponents based on the analysis, and then reset the processing system. As an example, the service processor may identify that a particular Peripheral Component Interconnect (PCI) component has malfunctioned, and reboot the processing system without the malfunctioning PCI component. Particularly, the components of a processing system are identified by a range of addresses. When a particular component has malfunctioned, the service processor may remap the range of addresses assigned to the malfunctioned component to some other address location (e.g., address 0). In another example, the service processor can identify or map the bad parts of a system memory based on the collected information and reboot the processing system without accessing the bad parts of the system memory. In particular, when bad sectors are found, the service processor marks the bad sectors as unusable such that the operating system skips them in the future. Many system memories include spare sectors, and when a bad sector is found, the logical sector is remapped to a different physical sector.

The service processor also may be configured to identify specific data that is related to a particular error message and to transmit the identified data along with the error message to, for example, a local administrative console.

It should be noted that certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more processing systems (e.g., the processing system 200 depicted in FIG. 3) or one or more hardware modules of a processing system (e.g., the service processor 42 depicted in FIG. 2 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within the service processor 42) that is temporarily configured by software to perform certain operations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a service processor 42 configured using software, the service processor 42 may be configured as respective different hardware modules at different times. Software may accordingly configure a service processor 42, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more service processors, such as the service processor 42 depicted in FIG. 2, that are temporarily configured (e.g., by software) or permanently configured to perform the relevant operations. Whether temporarily or permanently configured, such service processors may constitute "processor-implemented" modules that operate to perform one or more operations or functions.

While the embodiments are described with reference to various implementations and exploitations, it will be understood that these embodiments are illustrative and that the scope of the embodiments is not limited to them. In general, techniques retrieving information from a processing system may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiments. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiments.

What is claimed is:

1. A processing system comprising:
    a central processing unit;
    a service processor to monitor the central processing unit and operate independently from the central processing unit;
    a debug connection logic that is connected between the central processing unit and the service processor; and
    a memory in communication with the service processor, the memory being configured to store a diagnostic module that is executable by the service processor, the diagnostic module having instructions that when executed by the service processor, cause operations to be performed, the operations comprising:
        detecting that the central processing unit is stalled;
        transmitting a non-maskable interrupt to the central processing unit;
        detecting that the central processing unit is still stalled for a time period after the transmittal of the non-maskable interrupt;
        in response to detecting that the central processing unit is still stalled for the time period, transmitting a signal to the debug connection logic requesting access to the central processing unit for information;
        in response to the debug connection logic enabling the service processor to access the central processing unit for information, automatically retrieving central processing unit information from the central processing unit after the detection that the central processing unit is still stalled, the central processing unit information to include at least one of items of information selectable from a list of items including a state of the central processing unit, a central processing unit event, and contents of a register of the central processing unit; and
        resetting the processing system after the retrieval of the central processing unit information.

2. The processing system of claim 1, wherein the central processing unit comprises a test access interface and the service processor comprises a general purpose input-output port that is different than the test access interface, and wherein the service processor retrieves the central processing unit information from the central processing unit by way of the test access interface and the general purpose input-output port.

3. The processing system of claim 1, wherein the debug connection logic is configured to:
    enable the service processor to access the central processing unit for a different time period based on receipt of the signal; and
    disconnect the service processor from the central processing unit upon expiration of the different time period.

4. The processing system of claim 1, further comprising a hardware component in communication with the service processor, wherein the operations further comprise managing the hardware component.

5. The processing system of claim 1, further comprising a hardware component in communication with the service processor, wherein the operations further comprise collecting information associated with the hardware component.

6. The processing system of claim 5, wherein the operations further comprise storing the information associated with the hardware component and the central processing unit information in a non-volatile storage device.

7. The processing system of claim 5, wherein the operations further comprise transmitting the information associated with the hardware component and the central processing unit information to a different processing system.

8. The processing system of claim 1, further comprising a hardware component in communication with the service processor, wherein the operations further comprise monitoring a parameter associated with the hardware component.

9. A storage system comprising:
    a central processing unit comprising a test access interface;
    a service processor to monitor the central processing unit and operate independently from the central processing unit;
    a debug connection logic that is connected between the central processing unit and the service processor; and
    a memory in communication with the service processor, the memory being configured to store a diagnostic module that is executable by the service processor, the diagnostic module having instructions that when executed by the service processor, cause operations to be performed, the operations comprising:
   detecting that the central processing unit is stalled;
   in response to detecting that the central processing unit is stalled, transmitting a signal to the debug connection logic requesting access to the central processing unit for information;
   in response to the debug connection logic enabling the service processor to access the central processing unit for information, retrieving central processing unit information from the central processing unit by way of the test access interface, the central processing unit information to include at least one of items of information selectable from a list of items including a state of the central processing unit, a central processing unit event, and contents of a register of the central processing unit.

10. The storage system of claim 9, wherein the operations further comprise resetting the storage system after the retrieval of the central processing unit information.

11. The storage system of claim 9, wherein the operations further comprise transmitting a second signal to the debug connection logic in response to retrieving the central processing unit information, the second signal causing the debug connection logic to prevent the service processor from accessing the central processing unit.

12. The storage system of claim 9, wherein the operations further comprise analyzing the central processing unit information, and performing a reset of the storage system based on the analysis.

13. The storage system of claim 9, further comprising a network interface in communication with the service processor, wherein the operations further comprise transmitting the central processing unit information to a different processing system by way of the network interface.

14. The storage system of claim 9, wherein the debug connection logic is configured to:
   enable the service processor to access the central processing unit for a time period based on receipt of the signal; and
   disconnect the service processor from the central processing unit upon expiration of the time period.

15. A method of retrieving information in a processing system comprising a central processing unit, a service processor, and a debug connection logic that is connected between the central processing unit and the service processor, the service processor to monitor the central processing unit and operate independently from the central processing unit, the method at the service processor comprising:
   detecting that the central processing unit is stalled;
   in response to detecting that the central processing unit is stalled, transmitting a signal to the debug connection logic requesting access to the central processing unit for information;
   in response to the debug connection logic enabling the service processor to access the central processing unit for information, automatically retrieving central processing unit information from the central processing unit after the detection, the central processing unit information to include at least one of items of information selectable from a list of items including a state of the central processing unit, a central processing unit event, and contents of register the central processing unit; and
   resetting the processing system after the retrieval of the central processing unit information.

16. The method of claim 15, wherein the processing system further comprises a non-volatile storage device in communication with the service processor, the method at the service processor further comprising storing the central processing unit information in the non-volatile storage device.

17. The method of claim 15, wherein the central processing unit comprises a test access interface and the service processor comprises a general purpose input-output port that is different than the test access interface, and wherein the service processor retrieves the central processing unit information from the central processing unit by way of the test access interface and the general purpose input-output port.

18. The method of claim 17, wherein the test access interface is a Joint Task Action Group (JTAG) interface.

19. The method of claim 15, the method at the service processor further comprising monitoring at least one of a temperature, a voltage, or a current present in the processing system.

* * * * *